United States Patent
Boese et al.

(10) Patent No.: US 11,322,934 B2
(45) Date of Patent: May 3, 2022

(54) PROTECTION OF A SURGE ARRESTER WITH A BETTER PROTECTION AGAINST FAILURE FROM THERMAL OVERLOAD IN CASE OF A TEMPORARY OVERVOLTAGE IN AN ELECTRICAL GRID LINE

(71) Applicant: Hitachi Energy Switzerland AG, Baden (CH)

(72) Inventors: Ronald Boese, Wettingen (CH); Joel Antelo, Olten (CH); Remo Mugwyler, Pittsburgh, PA (US); Nicola Gariboldi, Nussbaumen (CH)

(73) Assignee: Hitachi Energy Switzerland AG, Baden (CH)

( * ) Notice: Subject to any disclaimer, the term of this patent is extended or adjusted under 35 U.S.C. 154(b) by 244 days.

(21) Appl. No.: 15/703,524

(22) Filed: Sep. 13, 2017

(65) Prior Publication Data

US 2018/0076617 A1 Mar. 15, 2018

(30) Foreign Application Priority Data

Sep. 13, 2016 (LU) .......................................... 93206

(51) Int. Cl.
*H02H 9/04* (2006.01)
*H01T 1/14* (2006.01)
(Continued)

(52) U.S. Cl.
CPC .............. *H02H 9/045* (2013.01); *H01H 9/02* (2013.01); *H01T 1/14* (2013.01); *H02H 7/24* (2013.01); *H02H 9/06* (2013.01)

(58) Field of Classification Search
CPC ...... H01C 7/126; H01H 37/76; H01H 39/002; H01H 9/02; H01T 1/12; H01T 1/14;
(Continued)

(56) References Cited

U.S. PATENT DOCUMENTS 2,504,438 A * 4/1950 John ........................ H01T 1/14
337/33
3,239,631 A 3/1966 Snell
(Continued)

FOREIGN PATENT DOCUMENTS

AU 2005200514 A2 6/2009
CN 101521065 A 9/2009
(Continued)

OTHER PUBLICATIONS

ArresterWorks[online]. arresterworks.com [retrieved on May 5, 2008]. Retrieved from the Internet: <URL: http://www.arresterworks.com/arresterfacts/pdf_files/arrester_disconnector.pdf> (Year: 2008).*
(Continued)

*Primary Examiner* — Jared Fureman
*Assistant Examiner* — Nicolas Bellido
(74) *Attorney, Agent, or Firm* — Sage Patent Group

(57) ABSTRACT

This present application concerns a method for preventing an electrical grid from a failure in case of a temporary overvoltage. A method comprising: a) providing an electrical grid line, a surge arrester and a disconnector device with a disconnector unit; b) connecting the surge arrester at one terminal to the electrical grid line; c) connecting the surge arrester at its other terminal to a second terminal of the disconnector device; d) connecting a first terminal of the disconnector device to ground potential; e) interrupting the electrical connection in between the electrical grid line and the ground potential in case of a temporary overvoltage; f) protecting the surge arrester from failure due to a thermal overload caused by the temporary overvoltages by operating the disconnector device before the surge arrester fails due to a thermal overload of the surge arrester.

16 Claims, 4 Drawing Sheets

(51) Int. Cl.
*H01H 9/02* (2006.01)
*H02H 7/24* (2006.01)
*H02H 9/06* (2006.01)

(58) Field of Classification Search
CPC ... H01T 1/16; H02H 1/04; H02H 3/20; H02H 3/202; H02H 3/205; H02H 3/207; H02H 3/22; H02H 3/24; H02H 7/09; H02H 7/1252; H02H 7/24; H02H 9/00; H02H 9/04; H02H 9/045; H02H 9/046; H02H 9/06
See application file for complete search history.

(56) References Cited

U.S. PATENT DOCUMENTS

| | | | | |
|---|---|---|---|---|
| 3,560,794 | A * | 2/1971 | Christener | H01T 1/15 315/36 |
| 3,755,715 | A * | 8/1973 | Klayum | H01T 1/14 361/120 |
| 4,204,238 | A * | 5/1980 | Stetson | H01T 1/15 361/125 |
| 4,577,148 | A * | 3/1986 | Sweetana | H02H 3/048 324/72 |
| 4,710,847 | A * | 12/1987 | Kortschinski | H01C 7/12 361/124 |
| 4,930,039 | A * | 5/1990 | Woodworth | H01C 7/12 361/117 |
| 5,057,810 | A * | 10/1991 | Raudabaugh | H01T 1/14 337/30 |
| 5,191,503 | A | 3/1993 | Kawamura et al. | |
| 5,523,916 | A * | 6/1996 | Kaczmarek | H01T 1/14 361/119 |
| 5,650,772 | A * | 7/1997 | Schmidt | H01T 1/12 340/664 |
| 5,952,910 | A | 9/1999 | Krause | |
| 5,991,141 | A | 11/1999 | Mikli et al. | |
| 7,433,169 | B2 * | 10/2008 | Kamel | H01C 7/12 361/127 |
| 8,711,538 | B2 * | 4/2014 | Woodworth | H01T 4/14 361/127 |
| 8,993,916 | B2 * | 3/2015 | Palvadi | H01H 69/00 218/157 |
| 9,130,354 | B2 * | 9/2015 | Ehrhardt | H01H 37/76 |
| 10,109,399 | B2 * | 10/2018 | Boese | H01H 85/44 |
| 10,454,251 | B2 * | 10/2019 | Mugwyler | H01H 37/76 |
| 2008/0068122 | A1 | 3/2008 | Lenk et al. | |
| 2010/0051437 | A1 * | 3/2010 | Kruska | H01C 7/12 200/502 |
| 2011/0018704 | A1 * | 1/2011 | Burrows | H04B 3/54 340/538 |
| 2014/0160634 | A1 | 6/2014 | Palvadi et al. | |
| 2016/0035529 | A1 * | 2/2016 | Durth | H01C 7/10 337/18 |
| 2017/0186575 | A1 | 6/2017 | Strangfeld et al. | |
| 2018/0075953 | A1 * | 3/2018 | Boese | H01H 39/002 |
| 2018/0366916 | A1 * | 12/2018 | Mugwyler | H01T 1/16 |

FOREIGN PATENT DOCUMENTS

| | | | | |
|---|---|---|---|---|
| CN | 201498291 U | * | 6/2010 | |
| CN | 201584650 U | * | 9/2010 | |
| DE | 19637984 A1 | * | 3/1998 | H01T 1/12 |
| DE | 19637984 A1 | | 3/1998 | |
| DE | 10025685 A1 | | 11/2001 | |
| DE | 102005015401 A1 | | 7/2006 | |
| EP | 0729209 B1 | | 9/1998 | |
| EP | 1566869 A1 | | 8/2005 | |
| EP | 1566869 B1 | | 7/2007 | |
| GB | 628155 A | * | 8/1949 | H01T 1/14 |
| GB | 782902 A | * | 9/1957 | H01T 1/14 |
| WO | 9717708 A | | 5/1997 | |

OTHER PUBLICATIONS

ArresterWorks[online]. arresterworks.com [retrieved on Oct. 30, 2012]. Retrieved from the Internet: <URL: http://www.arresterworks.com/arresterfacts/pdf_files/ArresterFacts_040_New_Arrester_Test_Requriements_in_IEEE_C62.11-2012.pdf> (Year: 2012).*
IEEE Xplore Digital Library [online], ieeexplore.IEEE.org [retrieved on Mar. 2, 2019]. Retrieved from the Internet: <URL: https://ieeexplore.IEEE.org/stamp/stamp.jsp?tp=&arnumber=8724171 > (Year: 2019).*
European Patent Office, Extended European Search Report issued in corresponding European application No. 17188606.2, dated Mar. 9, 2018, 11 pp.
Luxembourg Patent Office Search report and Written Opinion, dated Jun. 2, 2017, 10 pages (all but cover letter is in English).
International Search Report and Written Opinion of the International Searching Authority, PCT/EP2016/071499, dated May 30, 2017, 12 pages.
International Search Report and Written Opinion of the International Searching Authority, PCT/EP2016/071500, dated Dec. 22, 2016, 10 pages.
ABB Schweiz AG, Accompanying Letter under Article 19 PCT submitted to the European Patent Office dated Feb. 22, 2017 in PCT Application No. PCT/EP2016/071500, 9 pages.
IEC, International Standard IEC 60099-4, Edition 3.0, "Surge arresters—Part 4: Metal-oxide surge arresters without gaps for a.c. systems," Jun. 2014, 358 pages.
IEEE, "Standard for Metal-Oxide Surge Arresters for AC Power Circuits (>1 kV), Amendments 1: Short-Circuit Tests foi Station, Intermediate, and Distribution Arrestors," IEEE Std C62.11a-2008, 33 pages.
Australian Standard, "Surge arresters—Part 2: Metal-oxide surge arresters without gags for a.c. systems," AS 1307.2-1996, Committee EL/7, Power Switchgear, Dec. 5, 1996, 93 pages.
Extended European Search Report dated May 20, 2021 for European Patent Application No. 21154983.7, 11 pages.

* cited by examiner

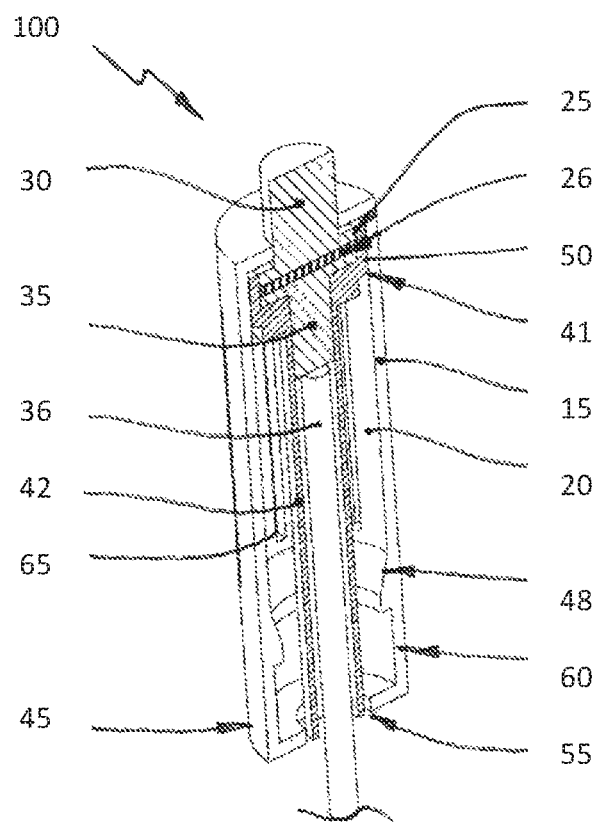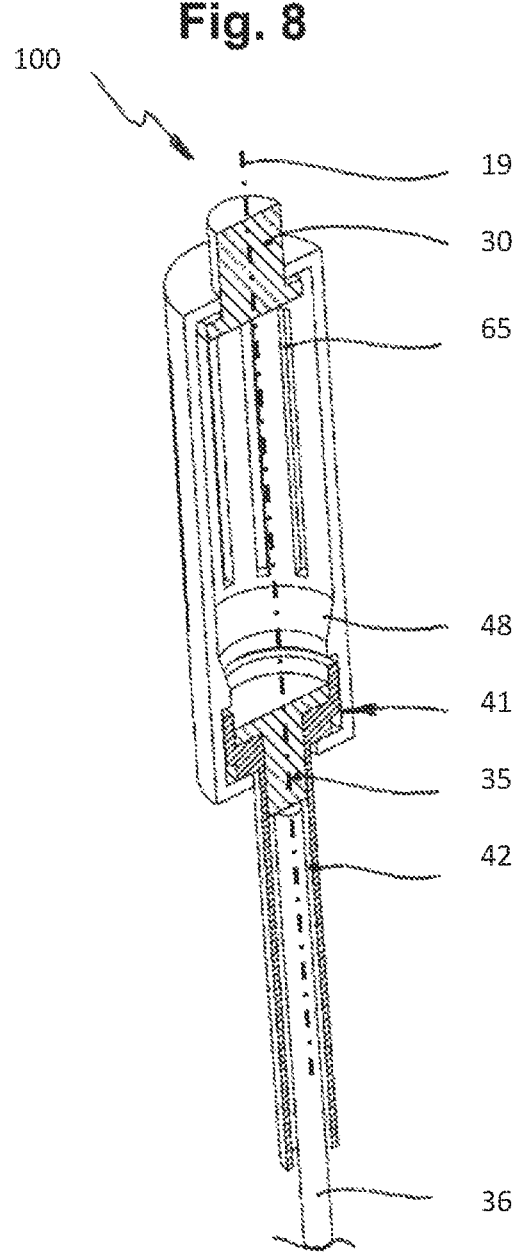

PROTECTION OF A SURGE ARRESTER WITH A BETTER PROTECTION AGAINST FAILURE FROM THERMAL OVERLOAD IN CASE OF A TEMPORARY OVERVOLTAGE IN AN ELECTRICAL GRID LINE

Aspects of the present disclosure relate to a method for preventing an electrical grid from a failure in case of a temporary overvoltage, a temporary overvoltage protection assembly for protecting an electrical grid line against temporary overvoltages and a disconnector device that is particularly suitable for such a protection assembly.

TECHNICAL BACKGROUND

Metal oxide surge arresters are electrical devices installed in electrical grids in order to protect other electrical apparatuses from the consequences arising of destructive overvoltages. Such consequences may result in damages of the electrical system as well as of its components. The working principle is based on a strongly nonlinear characteristic of the resistivity of metal oxide resistors as a function of the applied voltage. This allows a surge arrester to limit the damaging effects of a lightning-effected overvoltage by draining currents of many kiloamperes to ground for a short time, i.e. for some milliseconds. In comparison, a surge arrester has, under normal service conditions, a leakage current of parts of milliamperes over years of operation.

The maximum continuous voltage $U_c$ defines the condition under which the arrester can work indefinitely. An elevated voltage higher than $U_c$ can be applied for a limited time, which is specified by the manufacturer. Exceeding this specified time will cause a temporary voltage overload, which causes the Metal Oxide surge arrester to reach a thermal limit and to fail, resulting in a short circuit fault and in a permanent damage of the surge arrester.

This failure case is recognized by the international standards IEC 60099-4 and IEEE C62.11a by specification of a short circuit test. According to the test procedure, in order to prevent damages on the equipment installed close to the surge arrester in the substation, the surge arrester has to provide a failure mode without violent shattering of the housing, and shall be able to self-extinguish open flames within 2 minutes after the end of the test.

The problem of conventional assemblies for protecting an electrical grid line against temporary overvoltages resides in that the surge arrester suffers irreversible damage in case of a temporary overvoltage in the electric line lasting longer than a few tenths of milliseconds, e.g. longer than 100 ms extending over a few cycles up to several seconds or more, because the surge arrester suffers a thermal overload. The temporary overvoltage is referred to as TOV hereinafter such as known of IEC 60099-4:2014, edition 3.0, for example. The same standard defines impulse voltages with times lasting shorter than a few milliseconds e.g. shorter than 100 ms.

Past experiences have shown, that in case of a thermal overload, the surge arrester often triggers sparks and hot particles, both having enough energy to cause a fire in the surroundings of the conventional assemblies for protecting an electrical grid line against temporary overvoltages.

In regions having high fire hazards like Australia and some arid areas of the United States, additional technical specifications have set more severe requirements for reducing the risk of ignition of a fire: Additional to the normal requirements stated by IEC or IEEE, a surge arrester has to fail without spreading hot particles having enough energy to cause a fire in its surroundings.

This is proven by carrying out a short circuit test with the arrester mounted at a defined height to ground, wherein the ground has been previously covered with a thermal sensitive material that is easily inflammable. For example, Australia standard AS 1307.2 specifies many thin calibrated paper layers on the ground, while USA (Cal fire) specifies a fuel bed comprising dry grass, prepared with fuel.

Previous technical solutions for the protection from fire promotion by a surge arrester are mainly based on the concept of limiting the effect of the arc burning between upper and lower terminals of the surge arrester in case of a fault current. The consequence is that while the surge arrester is overloaded during testing (and later in the field), the temporary overvoltage causes a short circuit failure, and an electric arc is subsequently burning between the surge arrester terminals. The terminals are equipped with especially developed electrodes, which shall force the arc to move, thereby limiting the size of the melted metal droplets falling to ground.

For example, EP1566869 B1 discloses a shaped-electrode-concept for arc guiding in a surge arrester.

In view of the above problems, it would be beneficial to have a temporary overvoltage protection assembly that provides the surge arrester with a better protection against thermal overload problems in general and, where needed a better protection of the environment of the protection assembly against unintended fire caused by a temporary overvoltage in the electrical grid.

SUMMARY OF THE INVENTION

A better protection of the surge arrester with a better protection against thermal overload is achievable by the following basic protection method comprising the following steps.

a) providing an electrical grid line, a surge arrester and a disconnector device with a disconnector unit. The surge arrester is a conventional surge arrester that has been selected according to the requirements for a temporary overvoltage load.

b) connecting the surge arrester at one terminal to the electrical grid line;

c) connecting the surge arrester at its other terminal to a second terminal of the disconnector device;

d) connecting a first terminal of the disconnector device to ground potential;

e) interrupting the electrical connection in between the electrical grid line and the ground potential in case of a temporary overvoltage;

f) protecting the surge arrester from failure due to a thermal overload caused by the temporary overvoltages by operating the disconnector device before the surge arrester fails due to a thermal overload of the surge arrester.

In simple terms, the disconnector device connected in series to the surge arrester is sacrificed to prevent hot parts from a short circuited surge arrester falling to the ground and possibly igniting a fire and safe the operational availability of the electric grid in case of a TOV.

For preventing in case of a lightning stroke to the electrical grid line the desired effect that the surge arrester contributes to limiting the damaging effects of a lightning-effected overvoltage by draining currents of many kiloamperes to ground for a short time, e.g. for less than about 10 milliseconds, the protection method should have an additional step g) residing in protecting the disconnector device against unintentional operation in case of impulse voltages in the electrical grid line by bypassing a disconnector cartridge of the disconnector unit via an spark gap. Such a spark gap ensures that there is no electrical disconnection of the current path between the electrical grid and ground potential if an overvoltage in not a TOV in the aforementioned sense but an overvoltage lasting only a few milliseconds, for example.

In cases where the fire prevention requirement is of particular interest, the protection method should have the following additional steps.

h) A guiding of the gases generated at the time of operating the disconnector unit device to escape through a labyrinth of the disconnector unit to the environment of the disconnector device; and i) A spark retaining and/or a retaining of hot particles having enough energy to ignite a fire in the environment within the labyrinth of the disconnector unit such that they cannot leave the disconnector unit.

A disconnector device according to one of the following embodiments provides a highly effective protection against a fire hazard from surge arresters and/or from the disconnector device. Said disconnector device comprises a disconnector cartridge and a first terminal for establishing an electrical connection to a second terminal of a high voltage surge arrester. A temporary overvoltage threshold of the disconnector cartridge is chosen with respect to the designated high voltage surge arrester to whom it shall be connected such that the disconnector operates before the surge arrester fails due to a thermal overload of the surge arrester once the disconnector device is electrically connected to the surge arrester. In case of a temporary overvoltage, a disconnector unit inside a housing operates and interrupts the current in that it separates the two terminals of the disconnector unit device in a fast and reliable manner from each other during operation by a high acceleration of the one terminal.

In an exemplary embodiment, the disconnector device comprises:

a housing encompassing a cavity;

a disconnector unit provided inside the cavity, having a first terminal that is connectable to the surge arrester, a second terminal that is connectable to ground potential, and a member that is provided at the second terminal and is fitted to the housing. Moreover, the disconnector unit has a disconnector cartridge provided in the cavity for electrically separating the first terminal from the second terminal.

The disconnector cartridge is a charge comprising a varistor element that is designed such that it superheats before the dedicated surge arrester forming a further varistor superheats such that it reaches its thermal limit and fails. Expressed in simplified terms, the disconnector device acts as a fuse for saving the search arrester from suffering substantive damage from a TOV.

The aforementioned housing forms an inner housing of a housing unit. The housing unit comprises further an outer housing. The inner housing comprises at least one ventilation opening connecting the cavity to an outside of the inner housing. The outer housing comprises at least one further ventilation opening connecting the outside of the inner housing to an outside of the disconnector device for releasing gases from the operating disconnector cartridge. The at least one ventilation opening and the at least one further ventilation opening are displaced against one another such that a labyrinth for the gases from the operating disconnector cartridge is formed.

Depending on the embodiment, the cavity has a circular cross section or a polygonal cross section, in particular a hexagonal cross section when seen in an axial direction along a longitudinal axis defined by the overall cylindrical shape of the cavity and the moving direction of the movable member once the disconnector unit operates.

The technical effect of the labyrinth resides in that is allows the gas generated by the disconnector cartridge to escape to the environment via a gas escape path but at the same time prevents sparks and hot particles having enough energy to ignite a fire in the environment/surroundings of the disconnector device from leaving the labyrinth and setting environment on fire. In other words, the labyrinth serves as a containment means for all matter except gas in an operating state of the disconnector device.

Where desired, the disconnector cartridge and the movable member, optionally also the second terminal, may be provided as an integral part.

The labyrinth is designed such that no spark and no particle originating from the cavity can leave the cavity to the outside of the disconnector device unimpededly. The term unimpededly is understood as follows. The path for the hot gas escaping from the cavity leads through the at least one ventilation opening, the space in between the inner housing and the outer housing and the at least one further ventilation opening. Since said path forms at the same time the only potential travel path of a potentially hazardous hot particle or spark, said path cannot lead straight, i.e. linearly from the cavity to the environment of the disconnector device but leads in a zig-zag manner from the cavity to the environment of the disconnector device. That way, the a potentially hazardous hot particle or spark will fly and hit the walls of the labyrinth, i.e. it will be impeded by the labyrinth until all its kinetic energy is consumed and the spark extinguishes or the hot particle remains in the labyrinth.

Depending on the embodiment, said zig-zag-shaped path of the labyrinth can be formed by a displacement of the at least one ventilation opening and the at least one further ventilation opening in a circumferential direction with respect to the longitudinal axis axial direction, by a displacement of the at least one ventilation opening and the at least one further ventilation opening in an axial direction with respect to the longitudinal axis axial direction, or by a combination of a circumferential and an axial displacement of the at least one ventilation opening and the at least one further ventilation opening.

The labyrinth effect and thus the particle trap effect may be enhanced by additional rib structures provided on the inner wall surface of the outer housing, on the outer wall surface of the inner housing or on both wall surfaces, where required.

As an optional further safeguard measure, the at least one further ventilation opening is designed such that no particles of harmful size that are potentially capable of igniting a fire can pass through them.

The inventive disconnector device differs to known disconnector devices, in that its member is arranged in the housing in a movable manner such that it is guided by the housing and propelled from an initial position to an end position at an end of the cavity by gas from the disconnector cartridge in an operating state of the disconnector unit. This movement entails a mechanical disconnection of the surge arrester from ground potential and eventually a reliable interruption of the electric path in between the grid and the ground potential. Owing to the linear movement of the movable member, the cavity has an elongated, cylindrical overall shape. The term initial position is understood as the position of the second terminal before the disconnector unit gets into its operating state. The term end position at an end of the cavity is understood as the position of the second terminal has once the disconnector unit concluded its operating state. The movable member can move inside the cavity and is running in the cavity like a piston in a piston housing or in a cylinder.

That way it is possible to establish an insulation distance between the first and the second terminal of the disconnector device that is several times larger than in known devices and thus prevents a reliable interruption of the current in case of a temporary overvoltage in the electrical grid line.

The cavity, as defined by the inner wall of the housing, may have different cross sections such as a circle, a triangle, a square, a rectangle, a pentagon, a hexagon, heptagon, octagon, in general referred to as a polygon in this document. Embodiments of the disconnector device having a cross-section of the movable member and of the cavity of polygonal shape are advantageous because the second terminal is prevented from rotating about the longitudinal axis. As a result, such a set-up protects a ground cable connected in between ground potential and the second terminal of the disconnector device from being torn apart unintentionally by mechanical torsion.

Where required, a circumferential seal (not shown) may be provided between the movable member and the inner wall of the inner housing for enhancing the gas tightness.

Owing to the high speed and thus the high inertia of the movable member in the operating state of the disconnector unit, there is a danger that said movable member hits the housing unit at its end position and bounces back towards its initial position. Such a behaviour is undesired since it bears the risk that the insulation distance between the first and the second terminal of the disconnector device becomes that small that an undesired re-arcing and a re-establishment of the electric path between the first and the second terminal of the disconnector device is formed. That undesired effect can be prevented best in that the housing unit has a retaining section for retaining the movable member in the end position once the movable member was propelled towards the end of the cavity. That way, the two separated terminals of the device remain spaced from one another in a secure fashion after operation of the disconnector device.

In an exemplary embodiment of the retaining section of the housing unit, said retaining section is formed in that the inner housing has at least one protrusion protruding into the cavity. Depending on the embodiment of the at least one protrusion, it may be shaped as a lobe, a plurality of lobes, an annular rim or segments of an annular rim, for example. Those retaining means may form a form fit or a force fit connection with a dedicated portion of the movable member.

For closing the cavity in the axial direction with respect to the longitudinal axis, it is advantageous if the housing unit has an opening at the end of the cavity, wherein the movable member and the opening are adjusted to each other such that a portion of the movable member fits into that opening and thereby closes it such that no sparks and no particles of harmful size that are potentially capable of igniting a fire generated at the operating state of the disconnector cartridge can leave the cavity through that opening. In other words, it is advantageous if the movable member seals off the second end of the cavity in the axial direction. In an advantageous embodiment, the movable member is retained in an operating state of the disconnector in the disconnected state of the disconnector by retaining means as mentioned in the section above.

Where required, the guiding of the movable member by the inner housing may not exclusively be done by a contact geometry of the movable member within the wall of the inner housing delimiting the cavity but also by way of an additional guiding means. In an exemplary embodiment, said additional guiding means is achieved in that the movable member has a tubular section with a diameter fitting to the opening such that a movement of the movable member during operation of the disconnector unit is guided by the opening.

Where it is desirable that an observer, for example a staff member can tell from a distance to the housing on whether the disconnector unit already operated or whether it is still in its pristine state, the following embodiment of the disconnector device might be useful. In such a disconnector device, a portion of the movable member protrudes through the opening and such that it is visible from an outside of the housing after an operation of the disconnector unit. The term pristine state is understood hereinafter as the initial state of the disconnector device before operation, i.e. before the disconnector cartridge get into action. That effect can be enhanced if the portion of the movable member that is protruding through the opening is formed by the tubular section.

The detectability of the state of the disconnector device for an observer can be even more improved, for example the "operated" status, if the portion of the movable member protruding through the opening after operation of the disconnector unit has a signal colour for indicating visually better on whether the disconnector unit already operated or whether it is still in its pristine state.

Having a tubular section of the movable member of a certain substantial length is also advantageous in that it contributes substantially to protecting a ground cable connected to the second terminal of the disconnector device from buckling at the time of operating the disconnector device in a mounted state of the disconnector device. In an exemplary embodiment, the tubular section measures about 100 millimetres.

Test proved that satisfactory labyrinths are achievable if the at least one ventilation opening is not just a single opening but a plurality of openings in the inner housing. The same holds true accordingly for the at least one further ventilation opening accordingly.

In an exemplary embodiment, the ventilation openings are evenly distributed in the circumferential direction on the inner housing.

In an exemplary embodiment of the disconnector device, the at least one ventilation opening has a slot-like shape extending in the direction of a longitudinal axis defined by the overall shape of the cavity and a moving direction of the movable member, i.e. along the longitudinal axis at least partly. Such a setup is advantageous since the cross-section of the ventilation opening is small at the beginning of the movement of the movable member from its initial position. As a result, the gas pressure is available for propelling the movable member from the initial position towards an end position at the end of the cavity. The closer the piston-like movable member comes to the end position at the end of the cavity, the larger the overall cross-section of the ventilation opening becomes such that the gas pressure no longer contributes to propelling the movable member towards the second end to an extent as at the beginning of the operation.

Where required, the shape of the at least one ventilation opening as well as the shape of the at least one further ventilation opening may be tuned to meet specific speed requirements of the movable member.

If the disconnector device shall be particularly compact in overall size, it is advantageous if at least a part of the movable member has a cup shaped portion, wherein the cup portion encompasses the disconnector cartridge at least partly.

Since the first terminal of the disconnector unit is dedicated to be mechanically fixed to a bracket or the surge arrester, it is advantageous if the housing unit is mechanically connected to the first terminal of the disconnector unit in a substantially rigid manner.

Where required, the at least one further ventilation opening may be covered by a polymeric material, preferably by a thin polymeric foil, in a pristine state of the disconnector device.

Once the disconnector unit operates and the gas pressure in the cavity builds up quickly, the thin film will be torn apart such that the further ventilation opening works as intended. The foil can contribute to a protection of the interior of the disconnector device against environmental impacts such as rain, dust, insects and the like that might affect a proper function of the disconnector device negatively.

Since it is not desired that the disconnector unit operates at every temporary overvoltage in the electrical grid line but only in temporary overvoltage lasting longer than a predeterminable time it is advantageous to provide an electric bypass to the disconnector cartridge for the current. A basic embodiment of such a bypass is formed by a spark gap.

In a basic embodiment of such a disconnector device, the spark gap is formed in that at least one of the first terminal and the second terminal has a cup-shaped portion for laterally encompassing the disconnector cartridge in the direction of the longitudinal axis at least in part. The spark gap created by that measure is shorter in dimension than a thickness of the disconnector cartridge extending in the direction of the longitudinal axis. The dimension of the cup-shaped portion for laterally encompassing the disconnector cartridge in the direction of the longitudinal axis can be varied according to the demands on the spark gap in order to short circuit the disconnector device during impulse voltages in the electrical grid line where the disconnector unit shall not operate. While the current flows through the disconnector unit in an initial state of the temporary overvoltage, the disconnector cartridge operates after a predetermined time span that is determined by the current flowing and the characteristics of the disconnector cartridge.

An exemplary situation, where the temporary overvoltage is bypassing the disconnector cartridge via the spark gap, is formed by a lightning stroke to the electrical grid line where it is desired to allow the surge arrester to limit the damaging effects of a lightning-effected overvoltage by draining currents of many kiloamperes to ground for a short time, e.g. for less than about 10 milliseconds. In such a situation, the electrical grid line is electrically connected via the surge arrester and the spark gap of the disconnector device to ground potential.

Such an embodiment is advantageous since it increases the design freedom of such a disconnector unit is if the dimensions of the disconnector cartridge is given.

The aforementioned advantageous effects relating to the disconnector unit apply likewise to a temporary overvoltage protection assembly comprising a high voltage surge arrester and a disconnector device as explained above.

However, in addition or as an alternative, a useful temporary overvoltage protection assembly for protecting the surge arrester even with a different disconnector unit than the one described in this disclosure is achievable if the following conditions are met.

A first terminal of the surge arrester is electrically connectable to an electrical grid line, whereas the first terminal of the disconnector device is electrically connected to a second terminal of the high voltage surge arrester, while the second terminal of the disconnector device is electrically connectable to ground potential. A temporary overvoltage threshold of the disconnector cartridge is chosen, i.e. selected such that the disconnector operates before the surge arrester fails due to a thermal overload of the surge arrester. That way, the current path through the surge arrester is interrupted before the latter gets irreversible damage.

A combined effect residing in a temporary overvoltage protection as well as in an optimal fire prevention of the environment in case of a temporary overvoltage is achievable if the above temporary overvoltage protection assembly is combined with a disconnector device having a labyrinth as explained in this document. Since the disconnector device operates before the surge arrester fails due to a thermal overload of the surge arrester, the surge arrester is prevented from developing sparks and hot particles having enough energy to cause a fire in its surroundings.

The disconnector device of the disconnector assembly is a disconnector device according to any one of the embodiments disclosed in this document.

BRIEF DESCRIPTION OF THE FIGURES

FIG. 5 shows a cross-sectional view of the housing unit of a disconnector device according to the first embodiment without disconnector elements like the first terminal, the second terminal, the disconnector cartridge, the movable member and the like;

FIG. 7 shows a simplified schematic cross-sectional view of a disconnector device according to a second embodiment in a pristine state, i.e. before operation; and FIG. 8 shows the disconnector device of FIG. 7 after operation.

DETAILED DESCRIPTION OF THE FIGURES AND EMBODIMENTS

Figure 1:
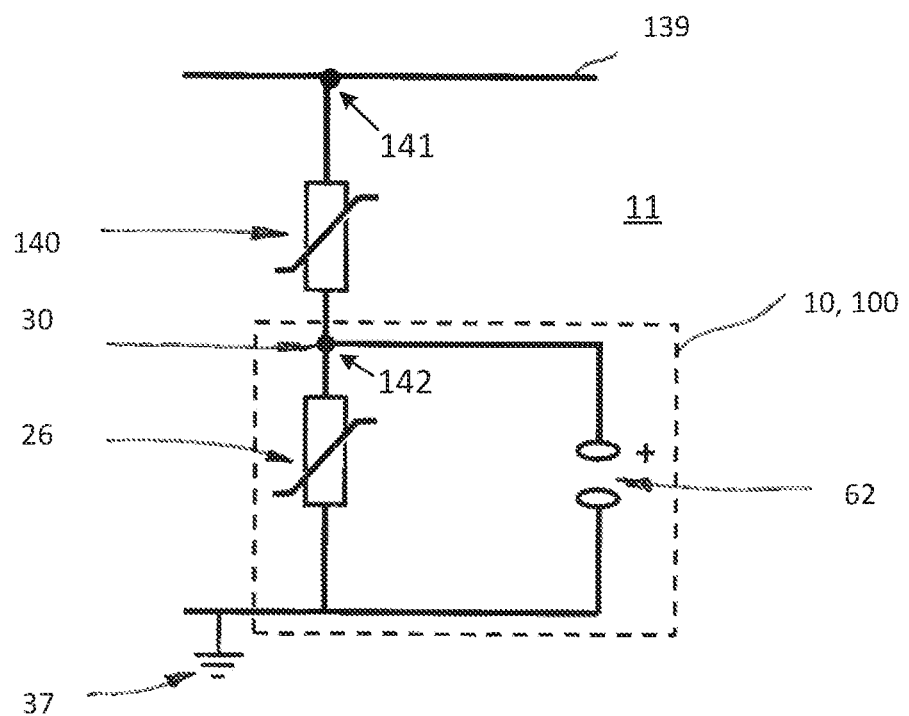
FIG. 1 shows a circuit diagram of a temporary overvoltage protection assembly connected to an electrical grid line and to ground potential.

The circuit diagram of a temporary overvoltage protection assembly 11 connected to an electrical grid line 139 and to ground potential 37 is shown and explained with respect to FIG. 1. A surge arrester 140 is electrically connected to the electrical grid line 139 at its first terminal 141 and to a first terminal 30 of a disconnector device 10, 100 at its other, second terminal 142. The disconnector device 10, 100 is indicated by the dashed box in FIG. 1. The disconnector device 10, 100 comprises a further surge arrester that is formed by the disconnector cartridge 26 and a spark gap 62 that is electrically connected in parallel to the further surge arrester. The surge arrester 140 is of known type such that the main focus is put on the explanation of the disconnector device 10, 100 hereinafter.

Figure 2:
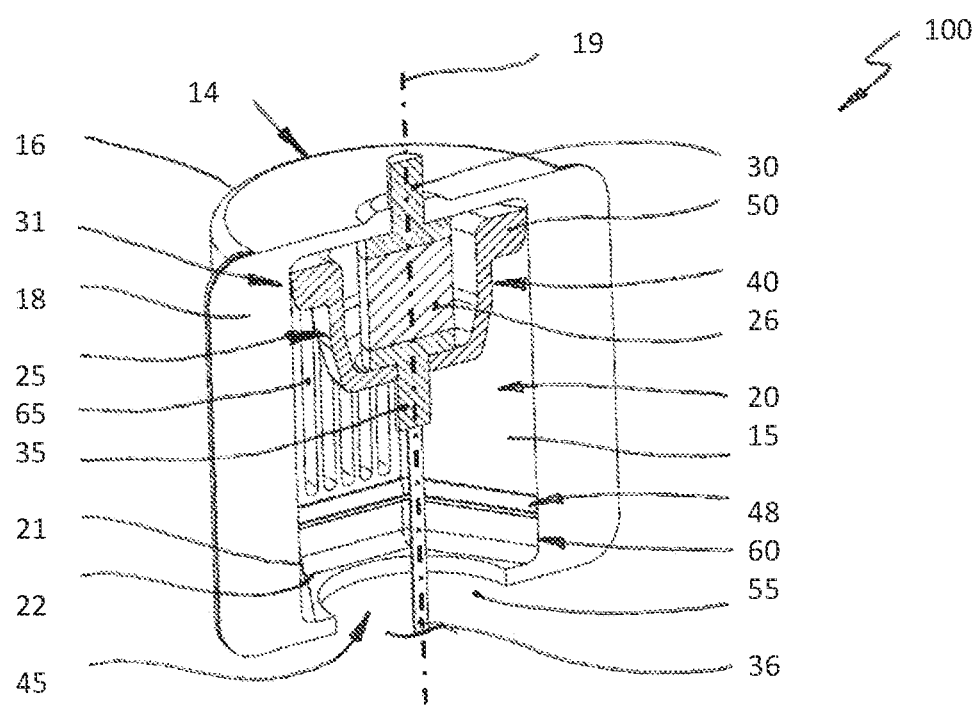
FIG. 2 shows a schematic cross-sectional view of a disconnector device according to a first embodiment in a pristine state, i.e. before operation.
Figure 5:
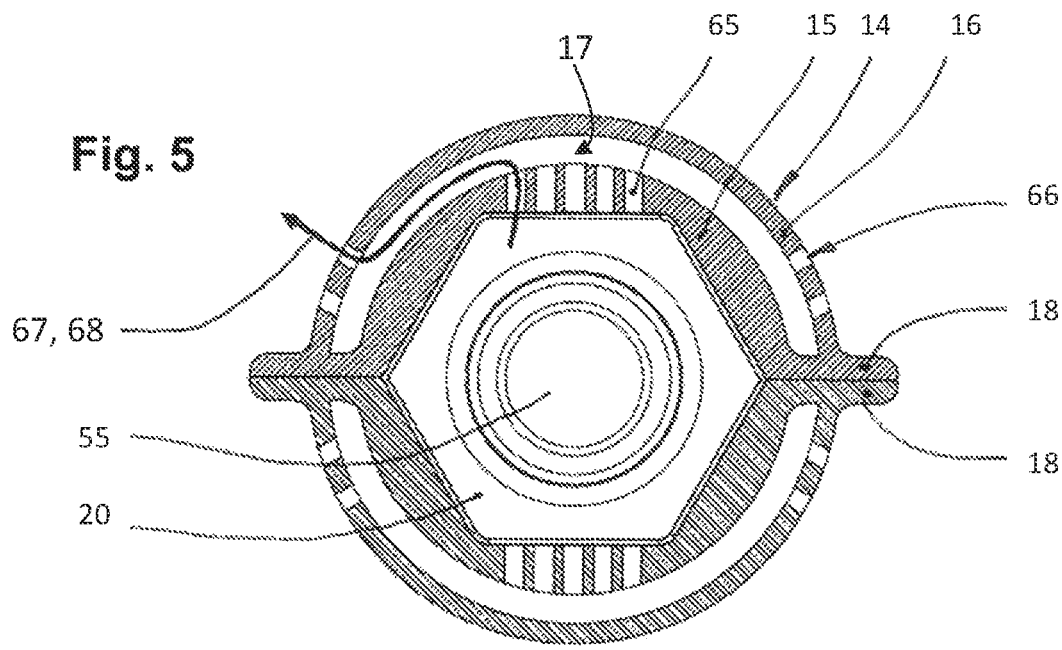

FIG. 2 shows together with FIG. 5 a first embodiment of a disconnector device 10 for a surge arrester. The disconnector device 10 has a housing unit 14, comprising an inner housing 15 and an outer housing 16 that extends about the inner housing 15. A gap 17 (see FIG. 5) is provided between the inner housing 15 and the outer housing 16. FIG. 2 shows just one halve of the housing unit 14. The halves of the housing unit 14 are connected to one another at a flange portion 18 by a bolt-nut connection, by fusion, riveting or other suitable connection means. The housing unit is made of an insulating material, such as a polymeric material.

The inner housing 15 delimits a cavity 20 where a disconnector unit 25 is provided. The disconnector unit 25 has a first terminal 30, which protrudes out of the housing unit 14. The first terminal 30 is designed to be fastened to a surge arrester (not shown). A second terminal 35 of the disconnector unit is connectable to ground potential 37, for example by way of an electrical cable 36 that is advantageous because of its flexibility. A disconnector cartridge 26 is provided between the first terminal 30 and the second terminal 35 of the disconnector unit 25 in a pristine state of the disconnector unit 25, i.e. before operation of the disconnector device. A movable member 40 is connected to the second terminal 35 of the disconnector unit 25. The movable member is fitted to the cross section of the cavity 20 such that it is guided like a piston within the cylindrical cavity 20. This is achieved by a rim 50 of the movable member 40 matching the shape and the size of the cross-section of the cavity 20 such that it acts as a slider geometry such that the movable member 40 can move freely inside the cavity 20 along a longitudinal axis 19.

When the disconnector unit 25 operates in case of a temporary overvoltage in the electrical grid line 139 and thus in the conductive pathway between the first terminal 30 and the second terminal 35 connected to ground, the disconnector cartridge 26 rapidly heats up and causes the disconnector unit 25 to break apart due to the developing hot gas, which is produced by the disconnector cartridge 26 and interrupt the current path between the first terminal 30 and the second terminal 35. The technology of disconnector cartridges is well known. Consequently, the movable member 40 together with the second terminal 35 is propelled inside the cavity 20 by the developing gas from the cartridge 26 towards a lower end 45 of cavity 20 shown in FIG. 1.

The cross-section of the movable member 40 and of the cavity 20 is hexagonal when seen in the direction of the longitudinal axis 19.

Adjacent to the end 45 of cavity 20 there is a retaining section 60 provided for retaining the rim 50 of the movable member 40 in its end position at the lower end 45 of the cavity 20 is formed by an annular protrusion 48 on the inner wall of the inner housing. The cross-section of said annular protrusion 48 is slightly deformable and has a conical shoulder 21 that allows the rim 50 of the movable member 40 to slide over it from the initial position 31 to the end position 32 (see FIG. 3) and a stop shoulder 22 that reliably and permanently prevents the rim 50 of the movable member 40 from moving back to its initial position.

In FIG. 2 the electric conduction path between the first terminal 30 and the second terminal 35 is not yet interrupted and leads via the electrically conductive disconnector cartridge 26.

Figure 3:
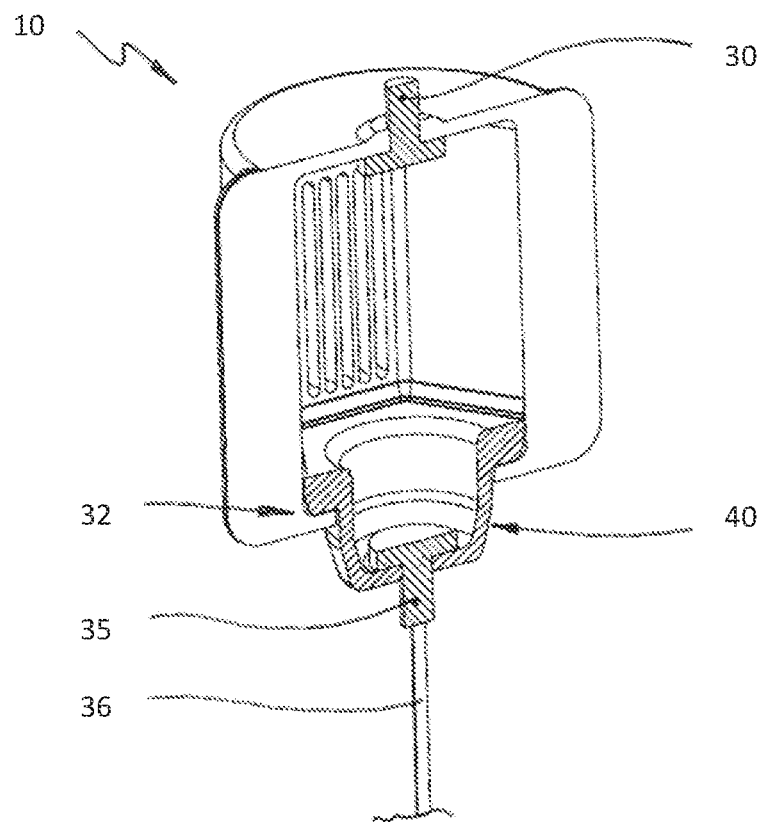
FIG. 3 shows the disconnector device of FIG. 2 after operation.

In FIG. 3, the status of the disconnector device 10 known from FIG. 2 is shown in a state after operation of the disconnector device 10. The movable member 40 has been propelled by the developing gas pressure from the operating disconnector unit 25 together with the second terminal 35 towards the end 45 of the cavity 20. The first terminal 30 and the second terminal 35 are displaced from one another by a predeterminable insulating distance such that the electric conduction path between the first terminal 30 and the second terminal 35 is interrupted. Since the disconnector cartridge 26 has vanished, i.e. its structure was dissolved during the operation of the disconnector unit 25.

In FIG. 3, the movable member 40 is located at the end 45 of cavity 20 and secure against any movement back to its initial position by the stop shoulder 22 of the protrusion 48. At the same time, the cavity 20 is effectively closed, with the exception of ventilation openings described further below. Thus, hot solid particles from the operating disconnector unit 25 are kept inside the cavity 20, and thus inside the housing 15.

The housing is designed to achieve different functions: It defines together with the movable member 40 a confined variable volume of the cavity 20, that makes use of the blasting energy of the disconnector cartridge 26 to provide a pressure build-up, which is suitable to cause a parting speed of the first terminal 30 (fixed) and the second terminal 35 (connected to the propelled movable member and to ground potential 37) which is high enough to interrupt the current in the temporary overvoltage situation. Further, by the retaining of the movable member 40, a subsequent restrike after current zero is avoided. The insulation distance between the first terminal 30 and the second terminal 35 is sufficient to prevent an undesired re-arcing in case of a temporary overvoltage.

In embodiments, the housing 15 has an opening 55 (see FIG. 2) located in the end 45 of the cavity 20. The movable member 40 and the opening 55 are adjusted to each other, such that after operation of the disconnector unit 25, a part of the movable member 40 fits into the opening 55 and thereby closes it. Exemplarily, this is shown in FIG. 2 and FIG. 3, while in the latter, the closed status after operation of the disconnector unit is shown. Thereby, the part of the movable member 40 protruding through the opening 55 is visible from an outside of the housing 15 by a human observer. In order to make the "operated" status more easily detectable by an observer, at least the part of the movable member 40 protruding through the opening 55 (see FIG. 3) may have a signal color, for example red or orange. There is only a small circumferential gap between the opening 55 and the tubular section 42 (see FIG. 8), for example having a size from 0.1 mm to 5 mm, more typically from 0.5 mm to 3.5 mm.

As shown in FIG. 2 and FIG. 3 along with FIG. 5, the inner housing 15 has a plurality of ventilation openings 65 connecting the cavity 20 to the gap 17 outside the inner housing 15. The outer housing 16 has a plurality of further ventilation openings 66 connecting the gap 17 to an outside of the disconnector device 10. The ventilation openings 65 and the further ventilation openings 66 are displaced against one another such that a labyrinth 67 for the gases from the operating disconnector cartridge 26 is formed on their way out of the cavity 20, i.e. on their gas escape path 68. FIG. 5 is a simplified cross-sectional view through the housing unit 14 without the movable member 40 such that the opening 55 at the bottom of the housing unit 14 is visible.

The ventilation openings 65 as well as the further ventilation openings 66 are slots having a slot-like shape extending in the direction of the longitudinal axis 19. The effect of the ventilation openings 65 is that the decrease of the gas pressure inside cavity 20 is promoted, while the movable member 40 moves towards the end 45 of the cavity 20.

In the embodiments depicted in FIGS. 2 and 3, the movable member 40 has the shape of a cup with a protruding rim 50, having a hexagonal cross section at least at a portion with the largest diameter. FIG. 2 discloses that the disconnector device 10 encompasses the disconnector cartridge 26 at least partly. In this manner, the volume between the first terminal 30 and the movable member 40 is designed such that is forms a significant part taken up by the disconnector cartridge 26. This ensures a very high acceleration when the movable member 40.

The first terminal 30 of the disconnector unit 25 is in some embodiments mounted to the housing 15 by screwing. That is, where the first terminal extends through the housing unit 14, the housing has an inner thread fitting an outer thread on the first terminal 30.

Figure 6:
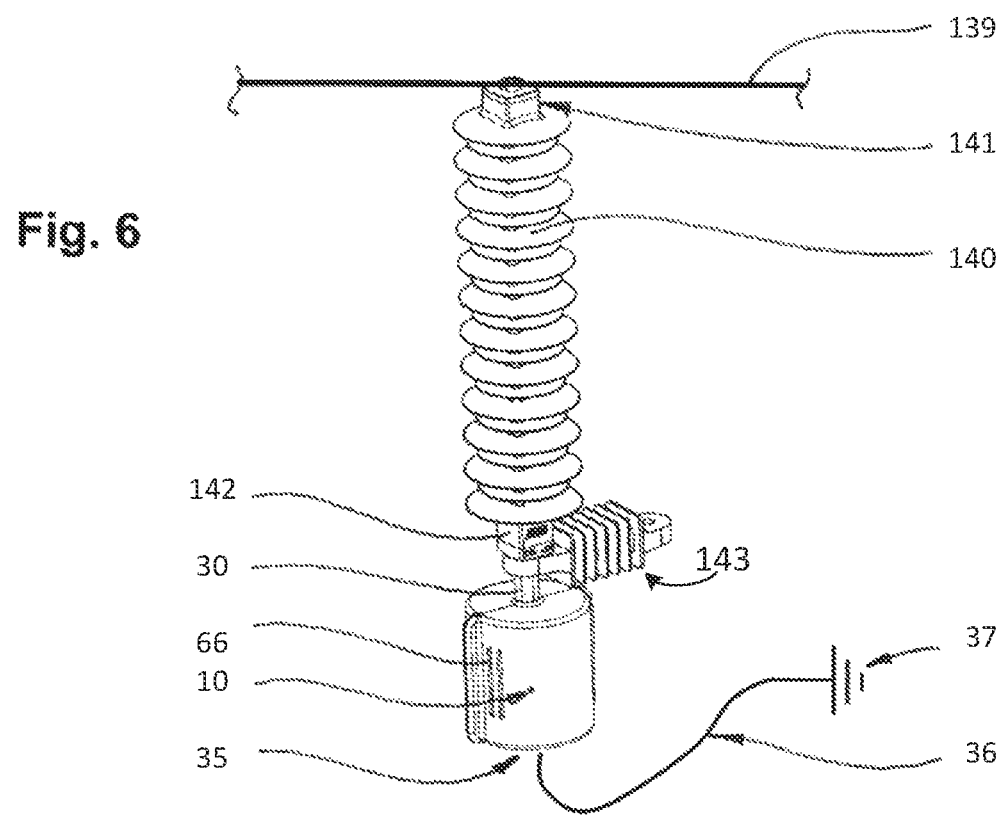
FIG. 6 shows a temporary overvoltage protection assembly with a surge arrester and a disconnector device according to the first embodiment.

FIG. 6 shows a temporary overvoltage protection assembly 11 with a disconnector device 10 that is electrically connected to a high voltage surge arrester 140. A first terminal 141 of the surge arrester 140 is electrically connectable to an electrical grid line 139. The first terminal 30 of the disconnector device 10 is electrically connected to a second terminal 142 of the high voltage surge arrester 140. The second terminal 35 of the disconnector device 10 is electrically connectable to ground potential 37 via a flexible ground cable 36. A bracket 143 is provided for mechanically fastening the temporary overvoltage protection assembly 11 to a structure such as a mast or pylon in an electrically insulated manner.

The temporary overvoltage protection assembly 11 work as follows. When the surge arrester 140 enters its conductive state once a predetermined threshold current is exceeded due to an over voltage fault, the resulting high current flows from the electrical grid line 139 through the surge arrester 140 and the disconnector device 10 towards ground. While it flows through disconnector unit 25 in an initial state of the temporary overvoltage, the disconnector cartridge 26 operates after a predetermined time span that is determined by the current flowing and the characteristics of the disconnector cartridge 26. Next, the disconnector unit 25 operates, while producing a volume of hot gas as well as some solid residues that are typically very hot. The resulting fast rise of the pressure in the cavity 20 propels the movable member 40 towards the end 45 of the cavity. At the same time, the current flow between the surge arrester 140 and ground potential 37 connected via the second terminal 35 to the disconnector device 10 is interrupted. By safely retaining the movable member 40 at the end of the cavity 20, and thus in a position distant to the first terminal, the risk of an undesired secondary arc ignition is eliminated and the temporary overvoltage problem is dissolved. Once the disconnector device 10 was operated, it has to be replaced because its disconnector cartridge 26 was consumed in the operating state.

Figure 4:
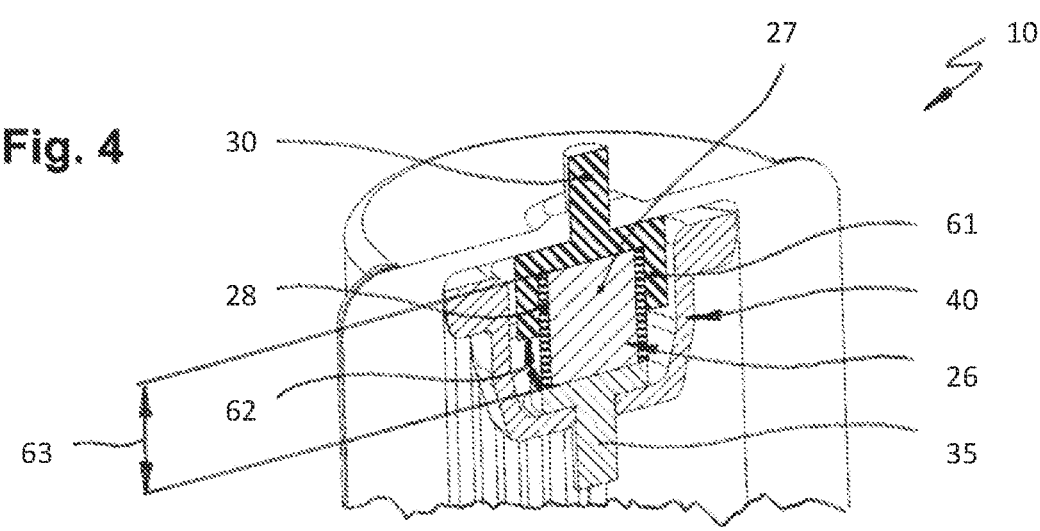
FIG. 4 shows a detail of a further embodiment of the disconnector unit differing to the disconnector device of FIG. 2.

The embodiment of the disconnector device 10 shown in FIG. 4 varies to the one shown in FIG. 2 only in one detail. Hence, FIG. 4 and the description relating thereto focus exclusively to the detail. Thus, identical or at least functionally identical elements of that embodiment are provided with the same reference characters as the embodiment shown in FIG. 2.

Contrary to the embodiment of the first terminal 30 shown in FIG. 2, the embodiment of the first terminal 30 shown in FIG. 4, the first terminal 30 has a cup-shaped portion 61 for laterally encompassing the disconnector cartridge 26 in the direction of the longitudinal axis 19 at least in part. As in the previous embodiments, the disconnector cartridge 26 is again a charge comprising a varistor element 27 formed by a SiC-block and a blank cartridge that is designed such that it superheats and operate by igniting the blank cartridge by temperature before the dedicated surge arrester 140 forming a further varistor superheats such that it reaches its thermal limit and fails. In this embodiment of the cartridge 26, the SiC-block is provided in a tubular insulation element 28 made of an electrical insulating material. The tubular insulation element 28 prevents that a current can creep along the lateral surface of the SiC-block 27 from the first terminal 30 to the second terminal 35.

The spark gap 62 created by that measure is shorter in dimension than a thickness 63 of the disconnector cartridge 26 extending in the direction of the longitudinal axis (19). The dimension of the cup-shaped portion 61 for laterally encompassing the disconnector cartridge 26 in the direction of the longitudinal axis 19 can be varied according to the demands on the spark gap 62 in order to short circuit the disconnector during impulse voltages in the electrical grid line 139 where the disconnector unit 25 shall not operate. It is not desired that the disconnector unit 25 operates at every temporary overvoltage in the electrical grid line but only in temporary overvoltage lasting longer than a predeterminable time.

A second embodiment of a disconnector device 100 is shown and described with respect to FIG. 7 and FIG. 8. Said second embodiment of a disconnector device 100 has basically the same working principle as the one described with respect to FIGS. 2 and 3. Hence, only the differences of the second embodiment compared to the first embodiment shall be discussed hereinafter whereas identical or at least functionally identical elements are provided with the same reference characters. FIG. 7 shows the disconnector device 100 in its pristine state, i.e. before operation whereas FIG. 8 shows it in its state after operation.

Please note that in the second embodiment of the disconnector device, the display of the outer housing 16 is there and arranged in the same fashion as shown in FIG. 5 but is not displayed in FIGS. 7 and 8 to keep the figures as simple as possible.

In the second embodiment, the cavity 20 in the inner housing 15 as well as the movable member 41 have a circular cross section. The rim 50 of the movable member 41 is longer in the direction of the longitudinal axis for easing the travel from the first position to an end position. The movable member 41 is again cup shaped and encompasses the disconnector cartridge 26 laterally and axially towards the lower end 45 of the cavity 20.

The tubular section 42 has a smaller diameter than the cup-shaped portion of the movable member 41. The diameter of the tubular section 42 and the diameter of the opening 55 are adjusted to each other such that the tubular section 42 can move freely in the opening 55. Again, there is only a small circumferential gap between the opening 55 and the tubular section 42, for example having a size from 0.1 mm to 5 mm, more typically from 0.5 mm to 3.5 mm. Once the disconnector cartridge 26 operates and the movable member 41 is propelled towards the end 45 of cavity 20, the movement of the movable member 41 is guided twofold, once by the rim 50 and the inner wall of the inner housing 15 and once by the diameter of the tubular section 42 and the opening 55.

In yet another embodiment of the disconnector device (not shown) forming a variation to the second embodiment 100, the cylindrical wall of the inner housing 15 has no ventilation openings 65. The gas escape path 68 leads through a first annular gap between the rim 50 of the movable member 41 and through a second annular gap between the tubular section 42 of the movable member 41 and the opening 55 of the housing unit 14. Thus, hot particles from the operating disconnector unit 25 are again kept inside the cavity 20, and thus inside the housing unit 14 as the first annular gap and the second annular gap form the labyrinth 67.

This written description uses examples to disclose the invention, including the best mode, and to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A disconnector unit configured to be connected between a surge arrester and a ground potential, the surge arrester configured to conduct a current from an electrical line to the ground potential across the disconnector unit, the disconnector unit comprising:
    a first terminal configured to be connected to one of the surge arrester or the ground potential;
    a second terminal configured to be connected to the other of the surge arrester or the ground potential; and
    a disconnector cartridge configured to react to the current flowing across the disconnector unit to forcibly separate the first terminal from the second terminal before the current causes the thermal overload of the surge arrester; and
    a housing defining a cavity around the disconnector cartridge, the housing configured to facilitate escape of gases and inhibit escape of solid particles from the housing.

2. The disconnector unit of claim 1, wherein the disconnector unit is further configured to operate in response to the current exceeding a predetermined current threshold for a predetermined time span, wherein the predetermined time span is selected to be less than a time span required for the current above the predetermined current threshold to cause the thermal overload of the surge arrester.

3. The disconnector unit of claim 1, wherein the disconnector cartridge comprises:
    a blank cartridge; and
    a varistor element connected between the first terminal and the second terminal,
    wherein the varistor element is configured to heat the blank cartridge to a predetermined temperature in response to the current flowing across the varistor element for a predetermined time span before the current causes the thermal overload of the surge arrester, and
    wherein the blank cartridge is configured to ignite at the predetermined temperature to disconnect the first terminal from the second terminal.

4. The disconnector unit of claim 3, wherein the varistor element comprises silicon carbide (SiC).

5. The disconnector unit of claim 1, further comprising a visual indicator connected to the first terminal, the visual indicator configured to, in response to operation of the disconnector cartridge, remain connected to the first terminal and visibly protrude from the housing.

6. The disconnector unit of claim 1, further comprising:
    a housing defining a cavity around the disconnector cartridge, the cavity having a first non-circular cross section; and
    a movable member coupled to the first terminal, the movable member having a second non-circular cross section at least partially corresponding to the first non-circular cross section to inhibit rotation of the movable member and the first terminal with respect to the housing about a first axis,
    wherein the disconnector cartridge is configured to propel the movable member and the first terminal in a linear direction along the first axis.

7. The disconnector unit of claim 1, further comprising a housing defining a cavity around the disconnector cartridge; and
    a retaining unit,
    wherein the disconnector cartridge is configured to propel the first terminal in a first direction toward the retaining unit, and
    wherein the retaining unit is configured to inhibit movement of the first terminal in a second direction opposite the first direction.

8. The disconnector unit of claim 1, further comprising
    a conductive element coupled to the first terminal and extending toward the second terminal adjacent to the disconnector cartridge,
    wherein the conductive element and the second terminal define a spark gap between the surge arrester and the ground potential, wherein the spark gap is shorter in dimension than a thickness of the disconnector cartridge.

9. The disconnector unit of claim 8, further comprising an insulating element surrounding the disconnector cartridge, and electrically isolating the disconnector cartridge from the spark gap.

10. The disconnector unit of claim 1, wherein the disconnector unit is further configured to define a spark gap between the surge arrester and the ground potential to bypass the disconnector unit without operating the disconnector cartridge in response to an impulse voltage across the surge arrester lasting less than a predetermined time period.

11. A disconnector device comprising:
    a first terminal configured to be electrically connected to one of a surge arrester or a ground potential;
    a second terminal configured to be electrically connected to the other of the surge arrester and the ground potential;
    a disconnector cartridge connected between the first terminal and the second terminal, the disconnector cartridge configured to operate in response to a current from an electrical line flowing across the disconnector cartridge;

an outer housing defining a cavity around the disconnector cartridge, the outer housing configured to facilitate escape of gases and inhibit escape of solid particles from the outer housing, such that operation of the disconnector cartridge is configured to produce heated solid particles having enough energy to ignite a fire in a predetermined environment, wherein the heated solid particles have a minimum particle size, the outer housing further defining at least one outer ventilation opening connecting the cavity to an outside of the outer housing, the at least one outer ventilation opening being smaller than the minimum particle size to facilitate escape of gases from the outer housing and preventing escape of the heated solid particles; and an inner housing disposed within the cavity and disposed at least partially around the disconnector cartridge to define an inner cavity, the inner housing defining at least one inner ventilation opening configured to facilitate escape of gases from the inner cavity into the cavity, the at least one inner ventilation opening further configured to prevent escape of the heated solid particles.

12. The disconnector device of claim 11, wherein the at least one inner ventilation opening is displaced from the at least one outer ventilation opening to define a non-linear escape path for the gases between the inner cavity and an exterior of the outer housing.

13. An overvoltage protection assembly comprising:
a surge arrester coupled to an electric line; and
a disconnector unit comprising:
a blank cartridge; and
a first varistor element coupled between the surge arrester and a ground potential, the surge arrester configured to enter a conductive state in response to an overvoltage such that a current flows through the first varistor element to the ground potential to heat the blank cartridge to a predetermined temperature in response to the current flowing across the first varistor element before the current causes a thermal overload of the surge arrester, the blank cartridge configured to ignite at the predetermined temperature to forcibly disconnect the surge arrester from the ground potential before the current causes a thermal overload of the surge arrester.

14. The overvoltage protection assembly of claim 13, wherein the surge arrester further comprises:
a second varistor element coupled to the electric line, and
wherein the disconnector unit further comprises:
a first terminal connected to second varistor of the surge arrester; and
a second terminal connected to the ground potential, the first varistor element connected between the first terminal and the second terminal,
wherein the blank cartridge is configured to ignite at the predetermined temperature to forcibly separate the first terminal from the second terminal before the current causes a thermal overload of the second varistor element.

15. The overvoltage protection assembly of claim 14, wherein the second varistor element comprises a metal oxide.

16. The overvoltage protection assembly of claim 14, wherein the first varistor element comprises silicon carbide (SiC).

\* \* \* \* \*